United States Patent
Brenner (10) Patent No.: US 12,485,803 B2
(45) Date of Patent: Dec. 2, 2025

(54) SUPPORT LEG REBOUND LOCK

(71) Applicant: Britax Römer Kindersicherheit GmbH, Leipheim (DE)

(72) Inventor: Marcel Brenner, Leipheim (DE)

(73) Assignee: BRITAX ROMER KINDERSICHERHEIT GMBH, Leipheim (DE)

(*) Notice: Subject to any disclaimer, the term of this patent is extended or adjusted under 35 U.S.C. 154(b) by 108 days.

(21) Appl. No.: 18/645,080

(22) Filed: Apr. 24, 2024

(65) Prior Publication Data
US 2024/0359601 A1     Oct. 31, 2024

(30) Foreign Application Priority Data
Apr. 28, 2023   (EP) .................................... 23170704

(51) Int. Cl.
*B60N 2/28*     (2006.01)

(52) U.S. Cl.
CPC ................... *B60N 2/2824* (2013.01)

(58) Field of Classification Search
CPC .. B60N 2/4221; B60N 2/2887; B60N 2/2884; B60N 2/4228; B60N 2/43; B60N 2/2824
See application file for complete search history.

(56) References Cited

U.S. PATENT DOCUMENTS

| | | | | |
|---|---|---|---|---|
| 8,973,987 B2* | 3/2015 | Mo | ....................... | B60N 2/2884 |
| | | | | 297/256.16 |
| 9,849,812 B2* | 12/2017 | Cheng | .................. | B60N 2/2887 |
| 10,730,412 B2* | 8/2020 | Pos | ....................... | B60N 2/2824 |
| 11,383,623 B2* | 7/2022 | Thorne | ................ | B60N 2/2884 |
| 12,115,890 B2 | 10/2024 | Ma | | |
| 2003/0006642 A1 | 1/2003 | Eppert et al. | | |

FOREIGN PATENT DOCUMENTS

| | | | | |
|---|---|---|---|---|
| EP | 0485121 B1 | | 3/1995 | |
| EP | 1279554 A1 | | 1/2003 | |
| EP | 3456581 B1 | | 4/2020 | |
| JP | 2003094994 A | * | 4/2003 | ........... B60N 2/2824 |
| JP | 4898037 B2 | | 3/2012 | |

OTHER PUBLICATIONS

Extended European Search Report from corresponding European Patent Application No. 23170704.3, dated Oct. 16, 2023. 7 pages.

* cited by examiner

*Primary Examiner* — Justin M Benedik
(74) *Attorney, Agent, or Firm* — K&L Gates LLP (57) ABSTRACT

The present disclosure relates to a foot prop or support leg for a child safety seat, a child safety seat, a seat base comprising such a foot prop and a child safety seat comprising such a foot prop or such a seat base. In one aspect, a support leg pivotally is connected with respect to a forward facing portion of the child safety seat so as to swing inward toward the seat and outward away from the seat, being characterised in that it further comprises a releasable locking means activated responsive to a forward acceleration of the seat to impose a limit to an extent of outward swing of the leg.

20 Claims, 8 Drawing Sheets

SUPPORT LEG REBOUND LOCK

PRIORITY CLAIM AND CROSS-REFERENCE TO RELATED APPLICATIONS

The present application claims priority from European Application No. 23170704.3 titled "SUPPORT LEG REBOUND LOCK" and filed 28 Apr. 28, 2023, the contents of which are hereby incorporated by reference in their entirety.

TECHNICAL FIELD

The present disclosure relates to a foot prop for a child safety seat, a child safety seat, a seat base comprising such a foot prop and a child safety seat comprising such a foot prop or such a seat base. In a particular form, the disclosure relates to a foot prop and its use with a seat base of a child safety seat or with a child safety seat.

BACKGROUND

Children, until they have reached a certain age or height, may not be secured in vehicles with the seat belts of the vehicle. Because of this, child safety seats must be used for safely transporting children in a vehicle. Smaller children, such as babies or toddlers, are held firmly in their safety seat mounted on a passenger seat of a vehicle with a special child restraint system, such as an integral harness system. For this age group, a safety seat with a 3-point or 5-point harness using a harness buckle as a coupling device is the safest way to travel. The 3-point or 5-point harness of the safety seat firmly secures shoulders and hips of the child in the seat.

Typically, child safety seats are mounted on a seat of the vehicle. The child safety seats are either secured by using the vehicle's seat belt, or by anchoring the child safety seat on the vehicle seat by using a particular anchoring mechanism, such as an Isofix system.

When using anchoring mechanisms, such as Isofix or LATCH (Lower Anchors and Tethers for Children), the child safety seat is attached by means of rigid links or latches to respective anchorage units of the vehicle seats, such as loop mountings fixed in the vehicle. These anchoring mechanisms generally employ two anchorage units. The anchorage units, thus, define a lateral axis of the vehicle. As a consequence, a child safety seat mounted by means of such an anchoring mechanism, e.g., an Isofix system, tends to rotate about said lateral axis.

The rotation of the child safety seat about the above-mentioned lateral axis might provide a severe danger and risk of injuries for the child being secured in the child safety seat in the event of both a frontal collision or a rear-end collision.

However, a rear-end collision typically causes the child safety seat to first rise from the vehicle seat and then to bounce back to its original position (rebound phase). The larger the force or energy of the impact is, the higher the child safety seat rotates about the lateral axis, and the higher the fall back is. As a consequence, the child is affected by high accelerations both in the rise from as well as in the fall back to the vehicle seat. In the case of a frontal collision, the child safety seat is also forced to rotate about the lateral axis, thereby being pressed downwards in the vehicle seat.

Different mechanisms for dealing with the unwanted rotation about the lateral axis defined by the, e.g., Isofix, anchorage units exist. One such mechanism is the so-called top tether. This mechanism comprises a tether and a rigid point in the vehicle body. The tether connects the rigid point to the top of the child safety seat, thereby preventing forward movement of the child safety seat relative to the vehicle seat in the case of a collision.

Another mechanism for dealing with the rotation is the so-called "Isofix Pivoting Link", to which European patent no. 1 090 804 is directed. The mechanism using the Isofix pivoting link operates to control the movement of the child safety seat so that forward and rotational movement thereof is translated at least in part into (translatory) downward movement of the child safety seat into the vehicle seat. Thus, this mechanism reduces the overall tilting angle of the child in a frontal impact.

A third mechanism for suppressing the rotation of the child safety seat about the lateral axis is given by a support leg, or foot prop as it is otherwise known. A support leg or foot prop for a child safety seat is a means to prevent the rotation of the child safety seat about the lateral axis in case of an impact. Typically, the support leg is attached to the front end of a seat base for a child safety seat. The seat base may be attached by Isofix links at its rear end to the corresponding anchorage units of the vehicle. The front end of the seat base with the attached foot prop may extend off the vehicle seat. The support supports the seat base against being pressed downward into the vehicle seat in the case of a frontal accident.

However, in the event of a rear impact, the seat pivots upwards and it is known for a support leg to pivot or fold back inwards towards the lower base. After the seat has rotated to its maximum height, it falls back down onto the seat during the rebound phase and finally lands on the support leg. In this rebound phase, the support leg is completely uncontrolled and free to pivot while not in contact with the vehicle floor, meaning the point at which it reconnects with the floor is uncontrolled, and may be unfavorable to the child occupant of the seat.

JP2003094994A discloses a support leg for a child seat which is attached to the front portion of the child seat to prevent the child seat from moving. The leg can be stored against the lower surface of the child seat when it is not in use.

It is against this background that the present disclosure has been developed.

SUMMARY

According to a first aspect, there is provided a child safety seat for use with a vehicle seat, the child safety seat comprising a support leg pivotally connected with respect to a forward facing portion of the child safety seat so as to swing inward toward the seat and outward away from the seat, and a locking means which, during an accident where the leg swings inward, is activated by a forward acceleration of the seat to impose a limit to an extent of outward swing of the leg.

In one form, the locking means is releasable.

In one form, the locking means allows inward pivoting of the support leg during an impact but then imposes a limit to an extent of outward swing of the leg during a rebound phase.

In one form, the support leg cannot return to its initial position and ends up at an angle defined by the locking means.

In one form, the locking means secures the leg at this outward limit.

In one form, the locking means is positioned adjacent to a pivot point for the support leg.

In one form, the locking means comprises a detent mechanism.

In one form, the locking means comprises an engaging member for engagement with the support leg.

In one form, the engaging member is movable between an engaged position and a disengaged position with respect to the support leg.

In one form, the locking means comprises a housing.

In one form, the engaging member comprises a pawl.

In one form this pawl pivots about a pivot point.

In one form, the pawl comprises a generally elongate body portion and a head portion that projects to one side the body portion.

In one form, the head portion of the pawl comprises an upward projecting ramp.

In one form, the ramp comprises an upper face which inclines away from an inside edge of the head portion.

In one form, the ramp comprises an upper face which inclines away from an inside corner of the head portion.

In one form, in an alternative, the engaging member comprises a pin.

In one form, this pin acts linearly.

In one form, the locking means comprises a biasing member acting against the engaging member.

In one form the biasing member biases the engaging member towards its disengaged position.

In one form, the locking means is configured so that it never locks the support leg inadvertently in daily use.

In one form, the support leg is pivotally connected with respect to a base of the child seat.

In one form, the base is integral with a body of the seat.

In one form, in an alternative, a body of the seat is separable from the base.

In one form, the child safety seat comprises a link projecting from the child seat body, and a releasable connector provided on the link for engagement with an anchorage unit associated with the vehicle seat.

According to a further aspect, there is provided a child safety seat for use with a vehicle seat, the child safety seat comprising a support leg pivotally connected with respect to a forward facing portion of the child safety seat so as to swing inward toward the seat and outward away from the seat, and a releasable locking means, wherein in use, the releasable locking means allows inward pivoting of the support leg but imposes a limit to an extent of outward swing of the leg.

According to a further aspect, there is provided a base for a child safety seat the child safety seat comprising a support leg pivotally connected with respect to a forward facing portion of the base so as to swing inward toward the seat and outward away from the seat, and a releasable locking means which, during an accident where the leg swings inward, is activated by a forward acceleration of the seat to impose a limit to an extent of outward swing of the leg.

According to a further aspect, there is provided a locking mechanism configured for securement with respect to a child safety seat comprising a support leg pivotally connected with respect to a forward facing portion of the seat so as to swing inward toward the seat and outward away from the seat, wherein, during an accident where the leg swings inward, the locking mechanism is activated by a forward acceleration of the seat to impose a limit to an extent of outward swing of the leg.

In one form, the locking mechanism comprises an engaging member for engagement with the support leg, and a biasing member to bias the engaging member towards its disengaged position.

In one form, the locking mechanism further comprises a housing with respect to which both the engaging member and the biasing member are secured.

In one form, the locking mechanism is configured for retrofit with respect to a child safety seat.

In one form, the locking means further comprises a pawl non-return means configured to permit the pawl to move from its disengaged position to its engaged position but prevent the pawl from returning to its retracted position.

In one form, the non-return means comprises an obstructing member movable between an unobstructive position and an obstructive position with respect to the pawl.

In one form, the pawl comprises a recess configured to receive the obstructing member and release the obstructive member as the pawl moves from its disengaged position to its engaged position.

In one form, the obstructing member comprises a nut.

In one form, in an alternative, the obstructing member comprises a ball bearing.

In one form, in an alternative, the obstructing member comprises a pin.

In one form, the obstructing member is biased into its obstructive position.

For ease of description, a child seat embodying the present features is described below in its usual is use position as shown in the accompanying drawings and terms such as front, rear, upper, lower, horizontal, longitudinal etc., may be used with reference to this usual position. However, the child seat assembly may be manufactured, transported, sold, or used in orientations other than that described and shown here.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
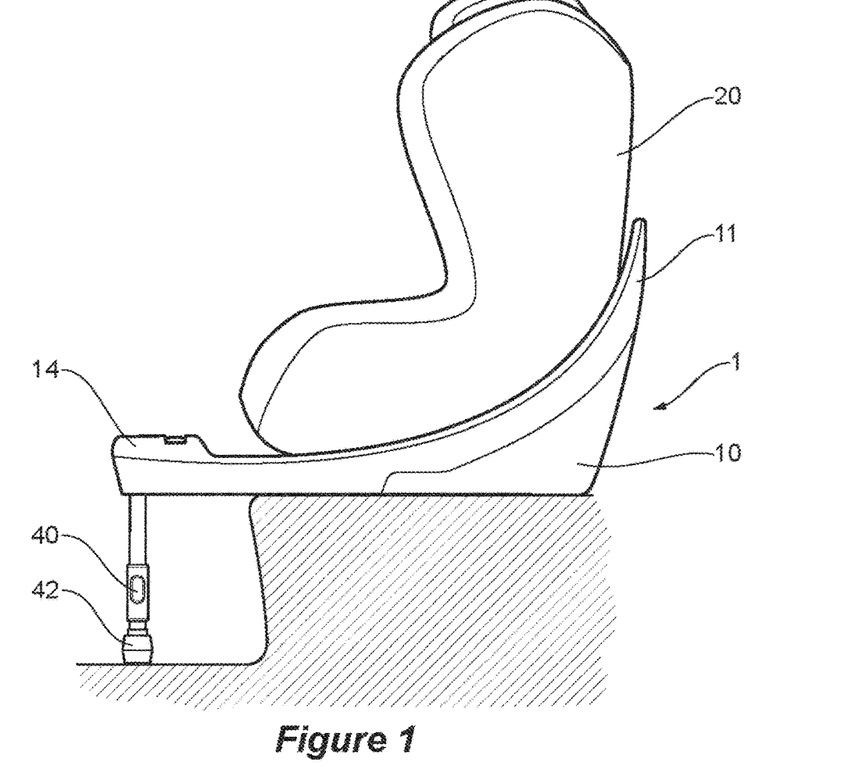
FIG. 1 is a schematic view of a child safety seat.
Figure 2:
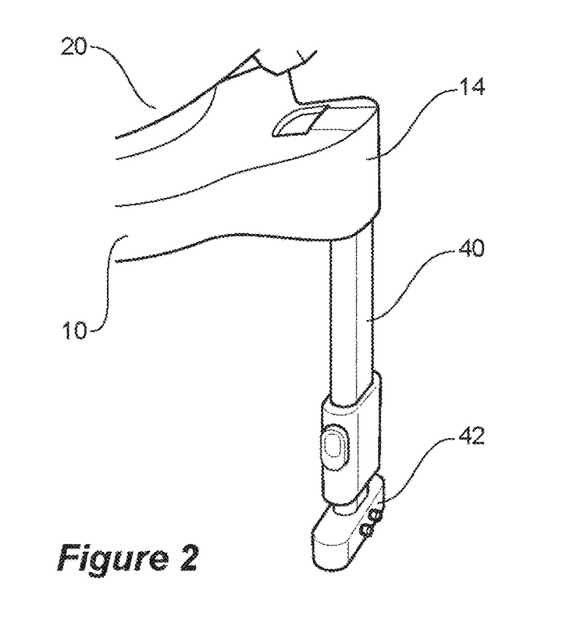
FIG. 2 is a detail view of a support leg of the child safety seat.

Referring now to FIGS. 1 and 2, there is shown a child safety seat 1 for use with a vehicle seat.

The child safety seat 1 comprises a seat base 10 comprising an anti-rebound bar 11. In the illustrated embodiment a child seat body 20 is releasably secured with respect to the seat base 10, although in an alternative the base could be integral with (i.e. not separable from) the body of the seat. The seat base 10 is releasably secured to the vehicle seat by means of connectors, such as, but not limited to, Isofix connectors. The connectors engage with respective anchorage units of the vehicle seat 1.

The child seat body 20 is commonly securable in either rearward or forward facing configurations within the vehicle, depending on the size and age of the child. The child occupant is secured in the child seat body 20. The present disclosure has particular benefit for the case of a rearward facing occupant secured in a seat fitted in a vehicle involved in rear end collision. It may also offer some advantage for a forward facing occupant.

A support leg 40 (otherwise known as a foot prop) is pivotally connected with respect to a forward facing portion of the seat base 10 of the child safety seat 1 at a pivot point PP, so as to swing inward toward the seat 1 (rearward in the vehicle) and outward away from the seat 1 (forward in the vehicle). This pivoting connection allows the leg 40 to be folded toward the seat 1 into a retracted and stowed position within an underside of the base 10, for compactness and ease of storage. When required, the leg 40 can be extended and its length locked in an installed or in-use position in which a foot 42 of the leg 40 contacts a cabin floor of the vehicle.

Referring now to FIGS. 3 through 8, the seat base 10 comprises a supporting frame 12 comprising a mount 14 for the support leg 40. The support leg 40 is positioned between a pair of spaced apart mount portions 14a and a pivot pin 16 passes through the support leg 40 and the mount portions to create the pivot point P.

Figure 3:
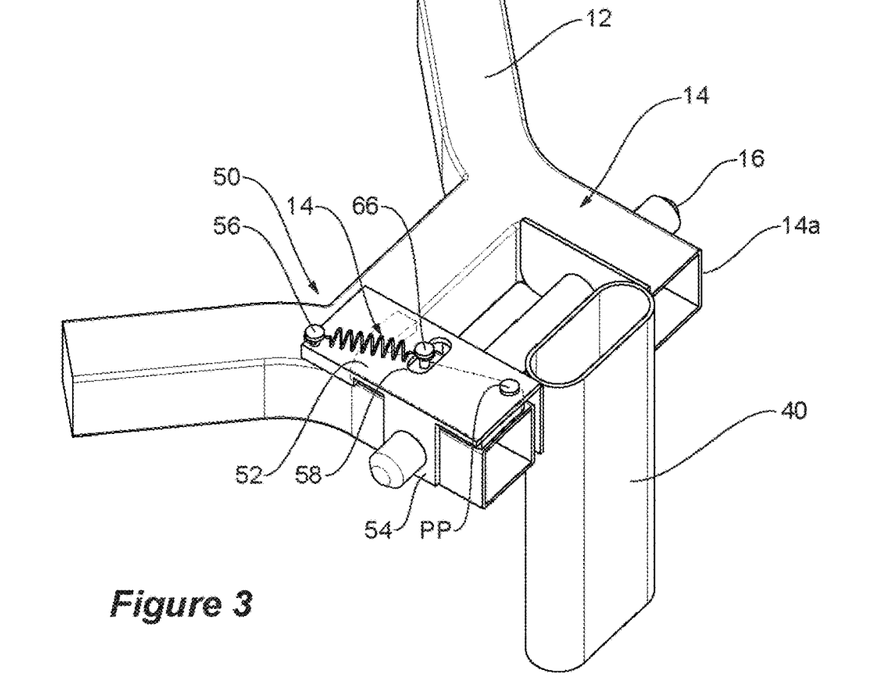
FIG. 3 is a detail view of a mount for the support leg.

A metal frame 12 is preferably provided, at least at the front of the child safety seat 1 for the support leg 40, which conveniently is formed of metal. Nevertheless, other possibilities such as a polymer support leg 40 and a polymer supporting structure for it can be envisaged.

A locking means 50 is positioned adjacent to a pivot P for the support leg 40.

Figure 5:
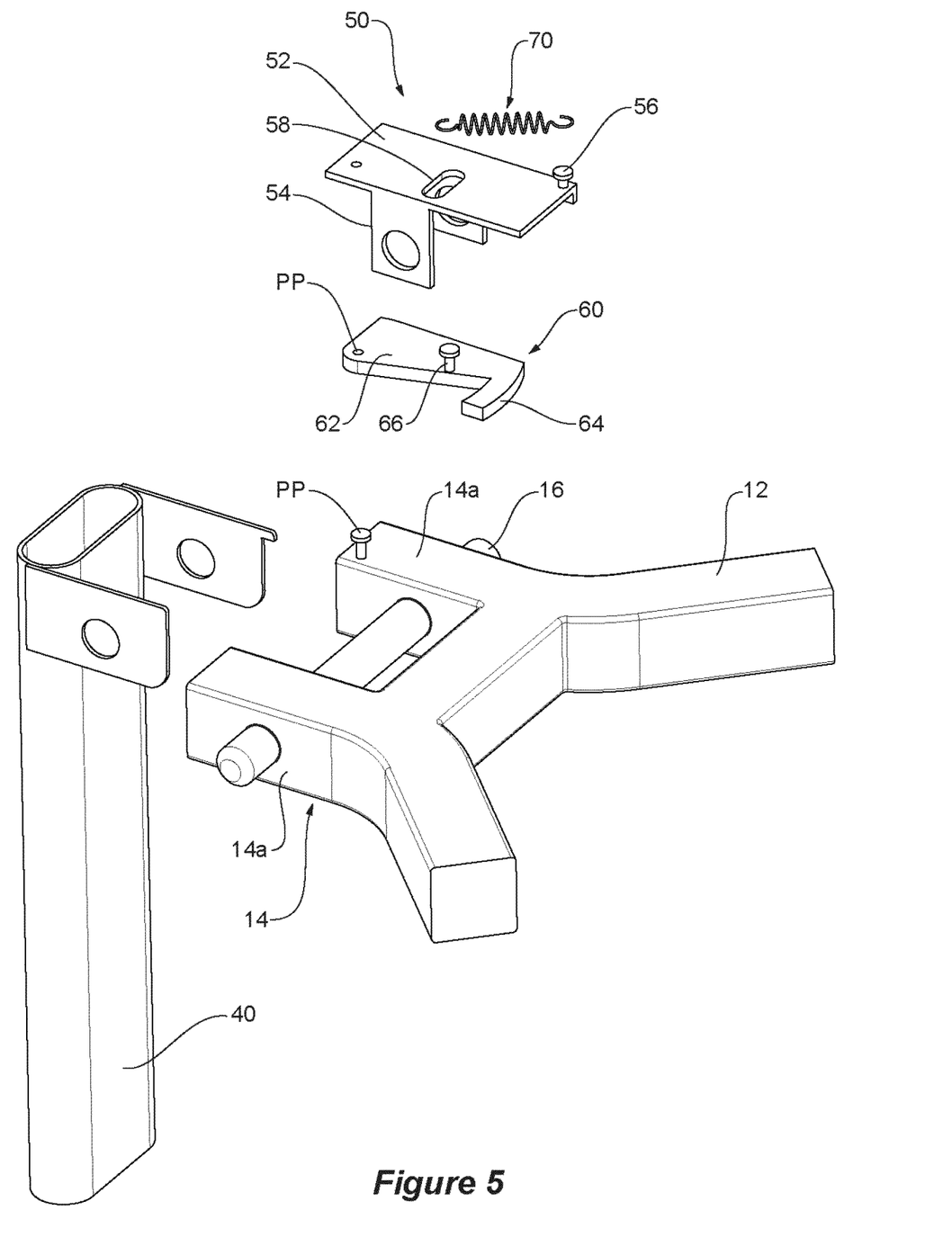
FIG. 5 is an exploded view of the locking means.

Referring to FIG. 5, the locking means 50 comprises a housing 52 that is secured with respect to the supporting frame 12 at a position near to the pivot point P for the support leg 40. In the illustrated embodiment, the housing 52 is secured with respect to one of the mount portions 14a of the frame 12, and comprises tabs 54 which locate over the pivot pin 16.

The housing 52 houses a pawl 60 that can rotate freely around a pivot point PP which secures the pawl 60 with respect to the housing 52.

The pawl 60 comprises a generally elongate body portion 62 and a head portion 64 that projects to one side the body portion 62. The pivot point PP and the head portion 64 are at distal ends of the body portion 62. The head portion 64 curves in an arc about the pivot point PP as it extends outwardly.

Both the pawl 60 and housing 52 illustrated are formed from a sheet of rigid material, but could be moulded from plastic. Both the pawl 60 and the housing 52 are laid flat atop an upwardly facing surface of one of the mount portions 14a, with the housing 52 uppermost, and oriented with pivot point PP being positioned forward on the seat 1 and the head portion 64 of the pawl 60 being rearward on the seat 1.

It is desirous that the housing 52 can be secured to the frame without any addition fasteners, such as by clipping to it, or by using existing features, such as the pivot pin 16 via locating tab 54, to effect its retention. Conceivably, the housing 52 and the pawl 60 could be made from a sheet of polymer of low sliding coefficient, which comes as a flat 2D design which has to be folded to form the housing 52. These parts could also be 3D printed or moulded.

Figure 6:
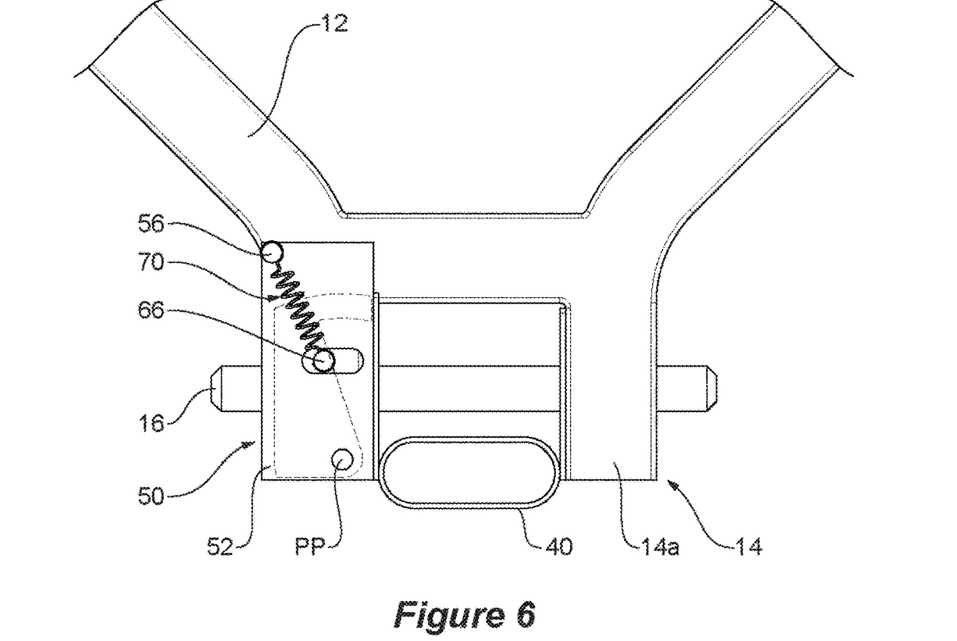
FIG. 6 is a plan view of the locking means showing the pawl retracted.
Figure 7:
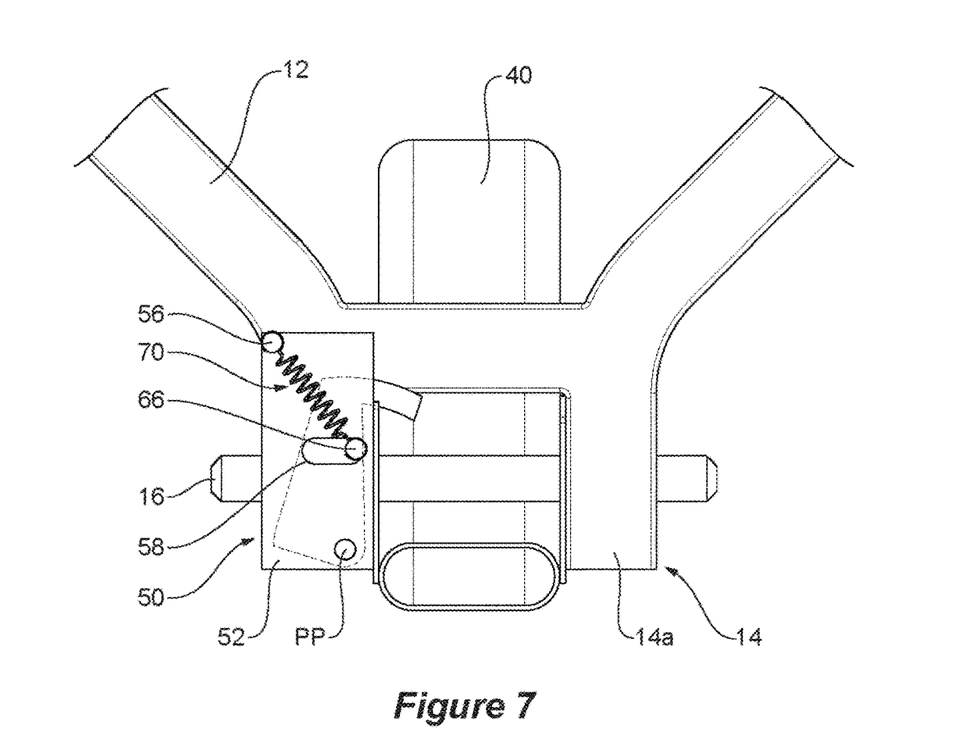
FIG. 7 is a plan view of the locking means showing the pawl extended.

The pawl 60 can pivot between a retracted position in which it is nearly entirely housed within the housing 52, and an extended position in which the head portion 64 of the pawl 60 projects from the housing 52.

A sliding surface between the housing 52 and pawl 60 might comprise ribs to assure sliding without any sticking.

It is conceivable that the locking means 50 could be provided as an assembly that can be retrofit to a seat 1.

A biasing member in the form of a spring 70 extends between an attachment point 56 on the housing 52, and an attachment point 66 on the pawl 60. The spring 70 biases the pawl 60 toward its retracted position in order to exclude unintentional deflection of the pawl 60 that would undesirably lock the support leg 40 in ordinary use. The attachment point 66 comprises a pin that extends through a slot 58 provided in the housing 52.

Figure 4:
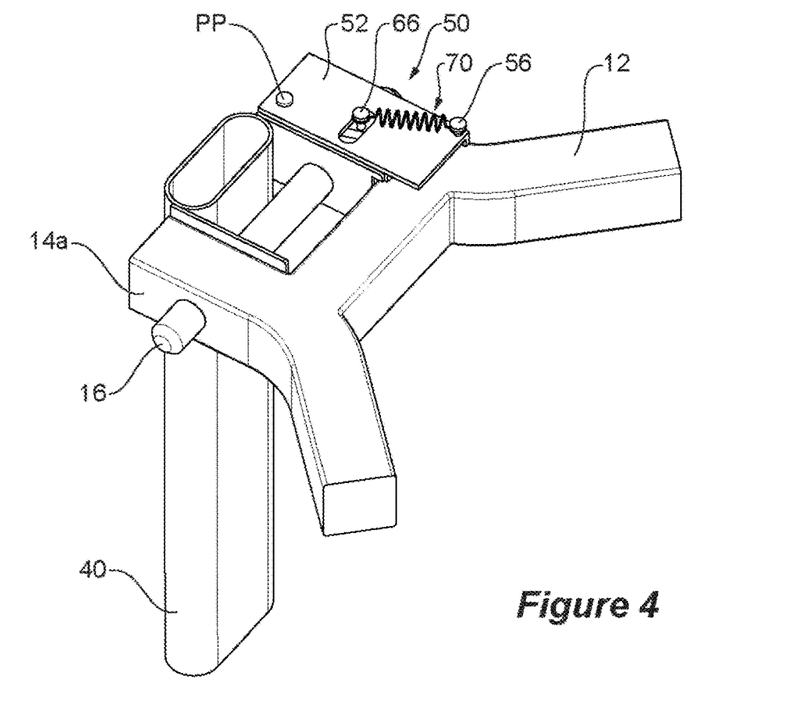
FIG. 4 is a detail view of a locking means for the support leg.
Figure 8:
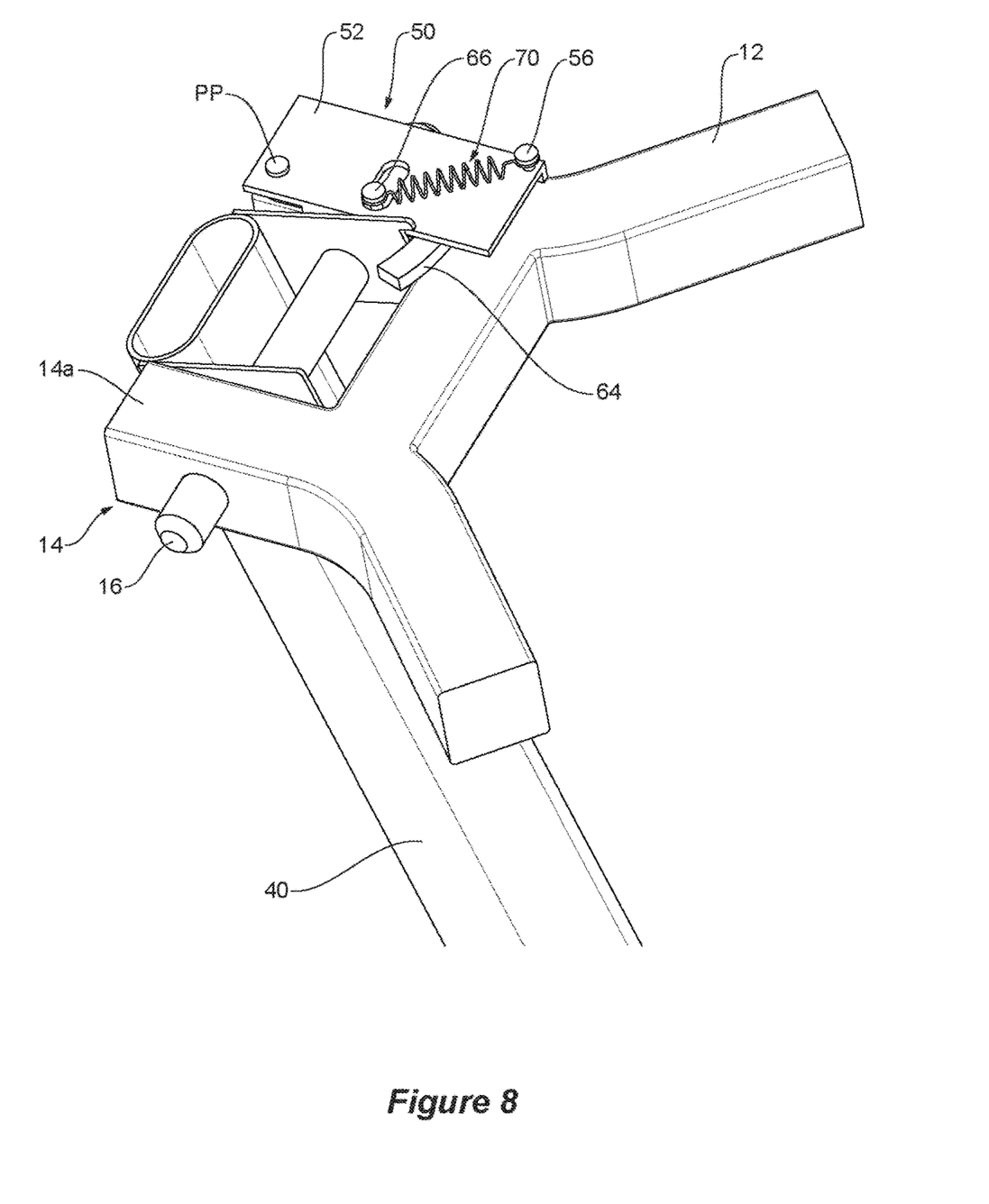
FIG. 8 is an isometric view of the locking means showing the pawl extended.

A centre of mass of the pawl 60 is positioned as far from the pivot point PP as possible so that the pawl 60 wants to pivot into its extended position in the case of an effective forward acceleration in +X (such as in the case of a rebound phase of a rear impact). However, this extension of the pawl 60 is prevented at the beginning because a lateral wall of the support leg 40 joint obstructs it, as illustrated in FIGS. 4 and 6. As soon as the support leg 40 folds in, as illustrated in FIGS. 7 and 8, this lateral wall of the support leg 40 moves upwards, and as soon as sufficient space is available, the pawl 60 shears out into the free space.

Due to the continuous acceleration and inertia, the pawl 60 remains extended during the rebound phase. As soon as the support leg 40 rotates back, the joint hits the top of the pawl 60, which blocks the support leg 40 from returning to its initial position. As a result, the support leg 40 can no longer return to its initial position and ends up at an angle defined by the pawl 60. The position of the pivot point PP and the outer shape of the pawl 60 are such that the pawl 60 can shear out of its housing 52 as far as practicable.

The force that might arise in a rear impact causes the child safety seat to rotate about the lateral axis defined by the connection point of the connectors of the rigid links and the anchorage units. This causes the front part of the seat base 1 to rise with regard to the vehicle seat. Therefore, the position and orientation of the child safety seat drastically differ from the as fitted position.

Advantageously, the locking means 50 allows inward pivoting of the support leg 40 during the crash but then prevents full outward pivoting in the rebound phase.

This ensures that the support leg 40 can "land" in a position where it is beneficial for the contact between head of the child occupant and headrest.

The angle of the support leg 40 when landing again on the vehicle floor has been found to be most disadvantageous when the support leg 40 is pivoted outwards to a maximum extent, as this causes the seat 1 to fall and rotate further, causing the occupant's head to hit the headrest with greater speed.

The angle of the support leg 40 when landing again on the vehicle floor has been found to be advantageous when the seat 1 is stopped from rotating sooner, at a slightly higher position, because the head of the occupant gets caught by the headrest earlier and thus more softly.

To this end, it has been found to be advantageous if, when landing again on the vehicle floor, the support leg 40 is at or near to vertical. Accordingly, desirably the locking means 50 limits an extent of outward swing of the leg 40 to at or near vertical.

The presence and operation of a locking means 50 could conceivably reduce the instance of head and neck injuries to very small children secured in a seat in a vehicle involved in a rear end collision.

Moreover, the presence and operation of a locking means 50 could conceivably reduce the size of a rebound bar required for a given seat. This might reduce the complexity and the cost of producing a seat.

Figure 9:
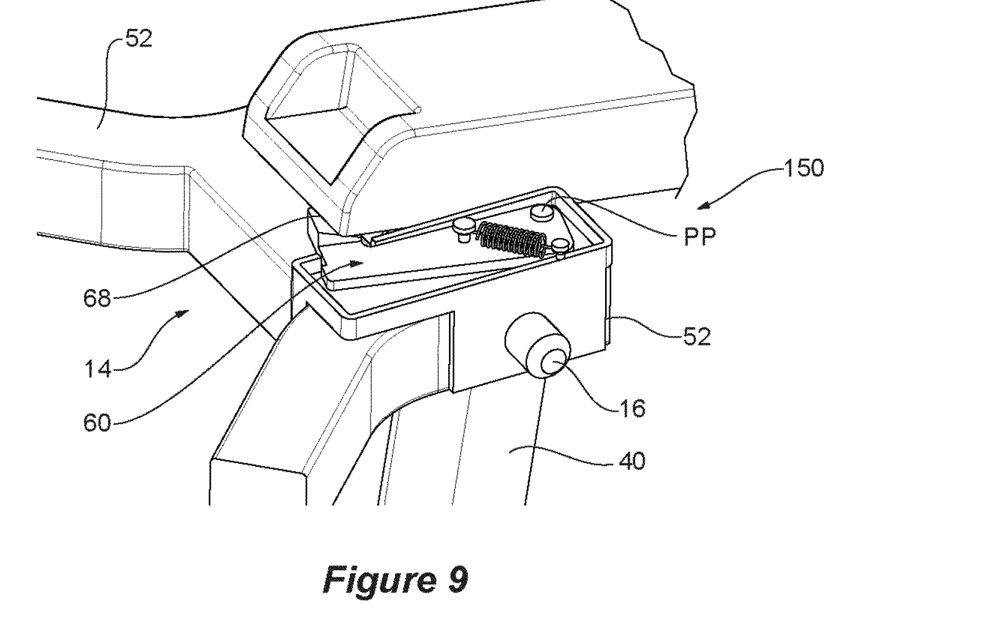
FIG. 9 is an isometric view of a locking means according to a further form.
Figure 10:
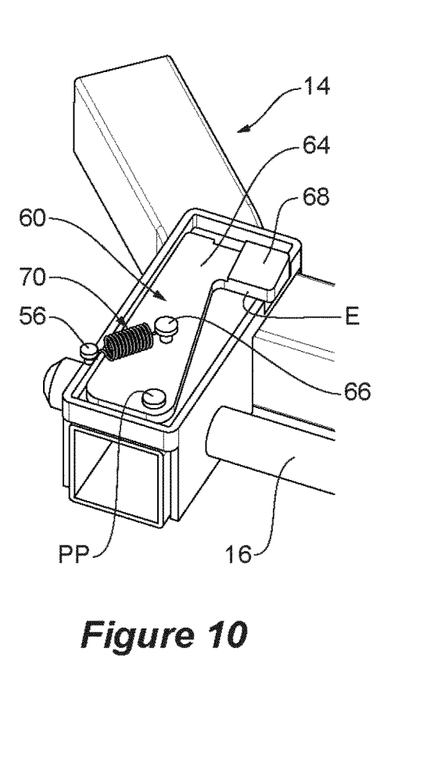
FIGS. 10 and 11 are detail views of the locking means of FIG. 9.
Figure 11:
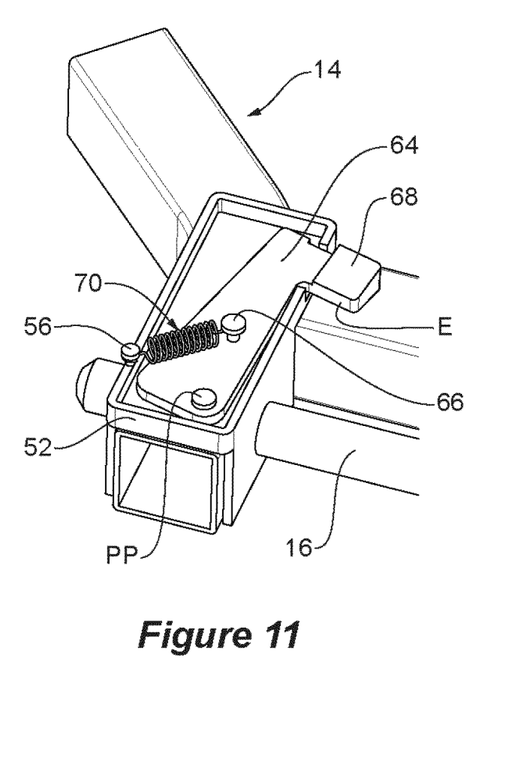

Referring now to FIG. 9 through 11, where there is illustrated a locking means 150 according to a further form. Those parts of the locking means 150 which are identical (or near-identical) to corresponding parts shown in locking means 50 of FIGS. 1 through 8, will be denoted by the same reference numerals and will not be described again in detail.

The head portion 64 of the pawl 60 of locking means 150 comprises an upward projecting ramp 68. This ramp 68 comprises an upper face which inclines rearwardly from an inside edge E of the head portion 64. The thickness of the head portion 64 increases as it extends rearwardly from the inside edge E, adding weight to the head portion 64 that aids pawl 60 operation.

An additional difference between locking means 150 when it is compared with locking means 50 is the position of the attachment point 56 for the spring 70 on the housing 52. For locking means 150, the attachment point 56 for the spring 70 on the housing 52 is positioned toward the same end of the pawl 60 as the pivot point PP of the pawl 60. This changes the line of action of the spring 70 with the intent of ensuring that the spring 70 does not unduly impair operation of the pawl 60 in the event of an effective forward acceleration in +X (such as in the case of a rebound phase of a rear impact).

In use, the upward projecting ramp 68 is intended to aid the earliest possible extension of the head portion 64 of the pawl 60 in the case of an effective forward acceleration in +X (such as in the case of a rebound phase of a rear impact) by reducing surface pressure in its engagement with the support leg 40. Moreover, the upward projecting ramp 68 stops rotation of the support leg sooner than a flat pawl 60 would, the advantage of which is discussed above.

Referring now to FIG. 12 through 16, where there is illustrated a locking means 200 according to a further form. Those parts of the locking means 200 which are identical (or near-identical) to corresponding parts shown in locking means 50 of FIGS. 1 through 8, will be denoted by the same reference numerals and will not be described again in detail.

Figure 12:
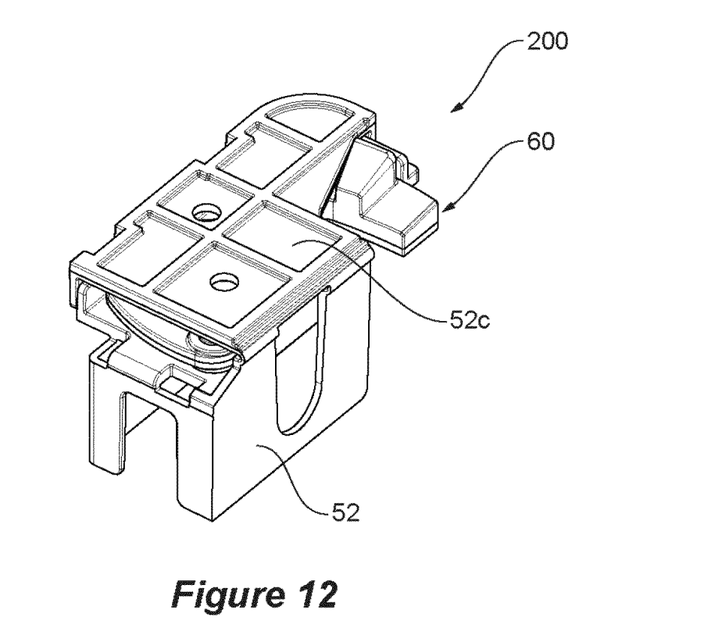
FIG. 12 is an isometric view of a locking means according to a further form.
Figure 13:
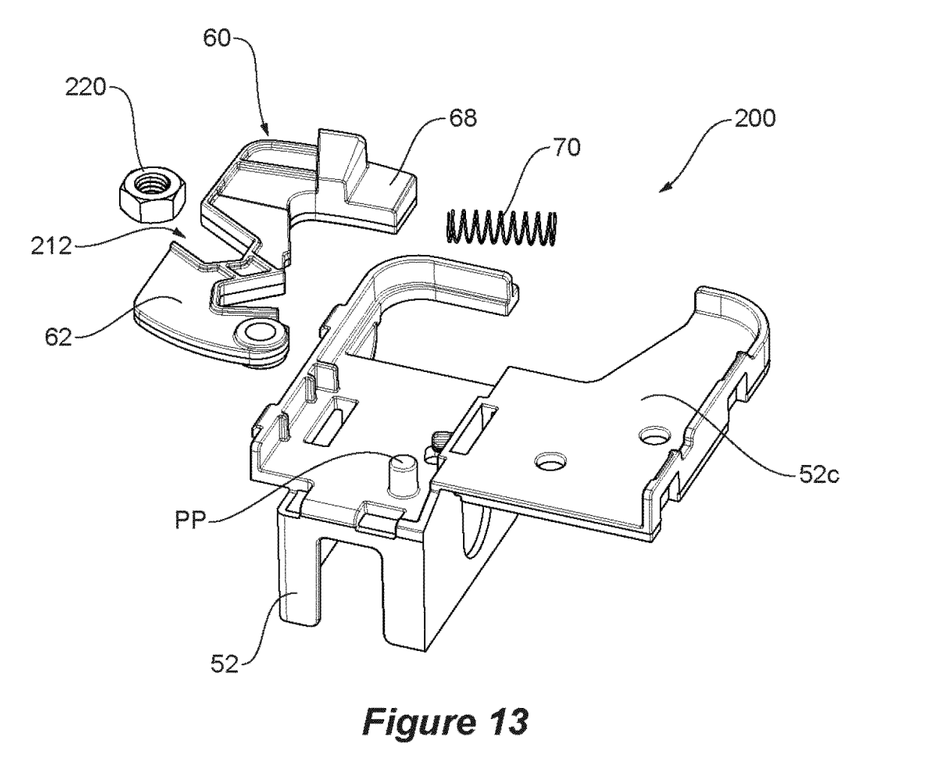
FIG. 13 is an exploded view of the locking means of FIG. 12.

In this form, the housing 52 and the pawl 60 are moulded from an engineering plastic material. The housing includes an integrally formed cover 52c which can be folded between an open position and a closed position in which is covers the pawl 60.

The body portion 62 of the pawl 60 comprises a recess 72 for receiving at least a portion of the spring 70. This gives the spring 70 a direct line of action against the pawl 60 and improves packaging of the parts within the housing 52 for compactness.

Notably, locking means 200 further comprises a pawl non-return means 210. In use, the pawl non-return means 210 permits the pawl 60 to move from its disengaged (or retracted) position to its engaged (or extended) position, but prevents the pawl 60 from returning to its disengaged (retracted) position.

The non-return means 210 comprises an obstructing member 220 movable between an unobstructive position and an obstructive position with respect to the pawl 60.

Figure 14:
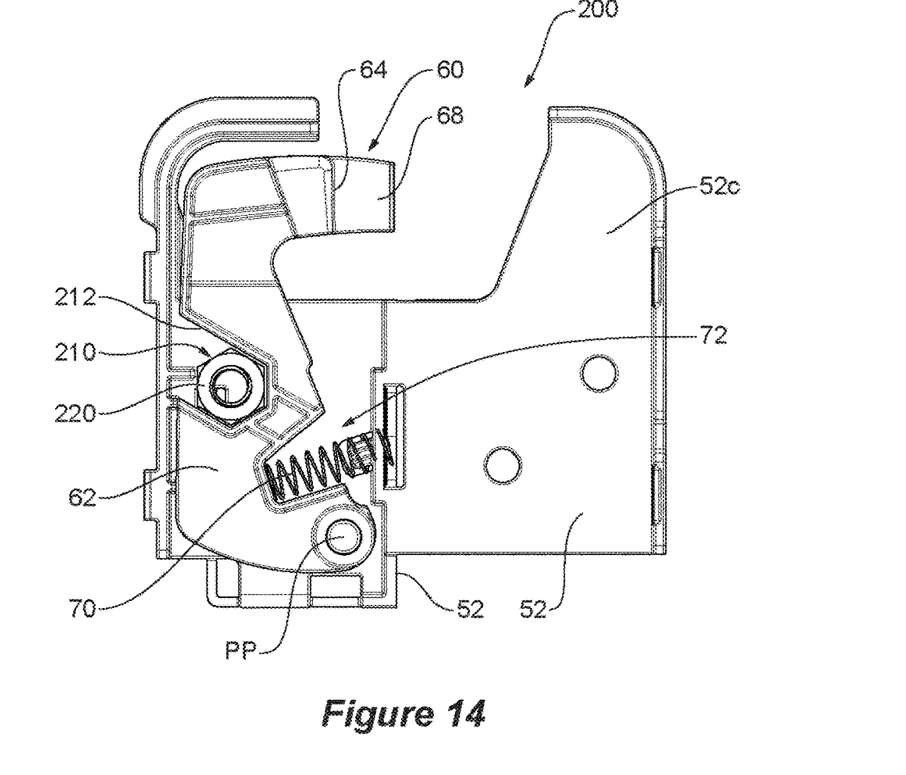
FIG. 14 is a plan view of the locking means of FIG. 12.

In the illustrated form, the obstructing member 220 comprises a nut, and the pawl 60 comprises a recess 212 for receiving the nut 220 within the plane of the pawl 60. The recess 212 comprises a slot of a width matching a dimension of the nut 220 across opposing flats. A blind end of the slot 212 is shaped to match an edge profile of the nut 220 so that the nut 220 is nested in the blind end of the slot 212. When so nested, the obstructing member, the nut 220 is in its unobstructive position. The slot 212 is inclined forwardly to an opening which breaks through an outer side edge of the pawl 60, so that the slot 212 forms a chute for the nut 220.

Figure 15:
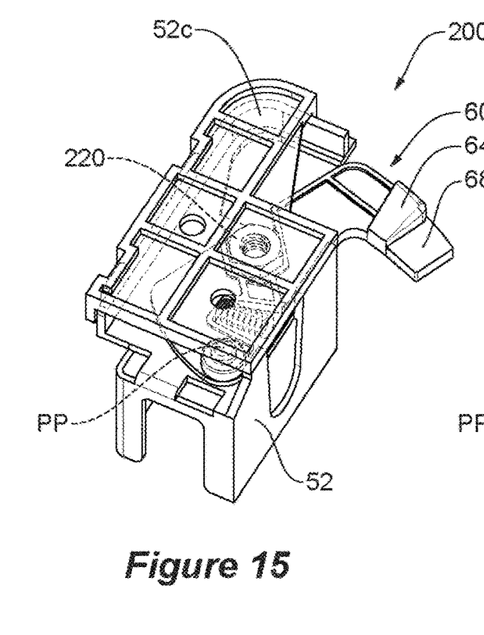
FIGS. 15 and 16 are isometric views of the locking means showing the pawl extended.
Figure 16:
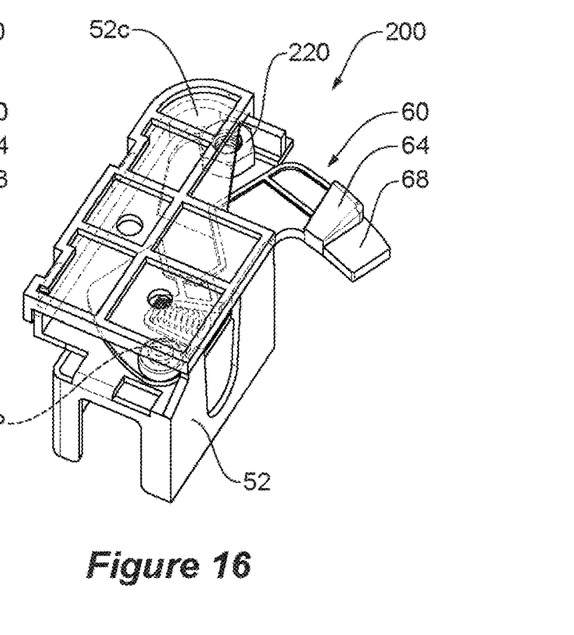

In use, in the event of an effective forward acceleration in +X (such as in the case of a rebound phase of a rear impact) as the pawl 60 moves to an engaged (extended) position the nut 220 travels in a forward direction until it leaves the recess 212 and enters a cavity vacated by the locking pawl 60 but otherwise occupied by the pawl 60 when it is stored in its disengaged (retracted) position. Consequently, the locking pawl 60 is prevented from returning to its disengaged position because the nut 220 becomes wedged between a rear side of the pawl 60 and a wall of the housing 52 and obstructs return movement pf the pawl 60.

The non-return means 200 acts as an additional safety stage for preventing the pawl 60 from being ineffective.

In an alternative non-illustrated form, the non-returns means 200 might comprise a ball detent or a spring loaded pin which is biased to extend into the cavity vacated by the locking pawl 60 but otherwise occupied by the pawl 60 when it is stored in its retracted position.

The reference to any prior art in this specification is not, and should not be taken as, an acknowledgement or any form of suggestion that such prior art forms part of the common general knowledge.

It will be understood that the terms "comprise" and "include" and any of their derivatives (e.g. comprises, comprising, includes, including) as used in this specification, and the claims that follow, is to be taken to be inclusive of features to which the term refers, and is not meant to exclude the presence of any additional features unless otherwise stated or implied.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

It will be appreciated by those skilled in the art that the disclosure is not restricted in its use to the particular application or applications described. Neither is the present disclosure restricted in its preferred embodiment with regard to the particular members and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A child safety seat for use with a vehicle seat, the child safety seat comprising a support leg pivotally connected with respect to a forward facing portion of the child safety seat so as to swing inward toward the seat and outward away from the seat, and a releasable locking means which, during an accident where the leg swings inward, is activated responsive to a forward acceleration of the seat to impose a limit to an extent of outward swing of the leg.

2. The child safety seat of claim 1, wherein the releasable locking means allows full inward pivoting of the support leg but then imposes the limit to the extent of outward swing of the leg.

3. The child safety seat as in either of the preceding claims, wherein post activation, the support leg cannot return to its initial position and ends up at an angle defined by the locking means.

4. The child safety seat of claim 1, wherein the locking means is positioned adjacent to a pivot point for the support leg.

5. The child safety seat of claim 1, wherein the locking means comprises an engaging member for engagement with the support leg.

6. The child safety seat of claim 5, wherein the engaging member is movable between an engaged position and a disengaged position with respect to the support leg.

7. The child safety seat of claim 5, wherein the engaging member comprises a pawl which pivots about a pivot point.

8. The child safety seat of claim 5, wherein the locking means comprises a biasing member acting against the engaging member.

9. The child safety seat of claim 8, wherein the biasing member biases the engaging member towards its disengaged position.

10. The child safety seat of claim 7, wherein the locking means further comprises a pawl non-return means configured to permit the pawl to move from its disengaged position to its engaged position, but prevent the pawl from returning to its disengaged position.

11. The child safety seat of claim 10, wherein the non-return means comprises an obstructing member movable between an unobstructive position and an obstructive position with respect to the pawl.

12. The child safety seat of claim 11, wherein the pawl comprises a recess configured to receive the obstructing member and release the obstructive member as the pawl moves from its disengaged position to its engaged position.

13. The child safety seat of claim 11 or 12, wherein the obstructing member comprises a nut.

14. The child safety seat of claim 11 or 12, wherein the obstructing member comprises a ball bearing or a pin.

15. The child safety seat of claim 11, wherein the obstructing member is biased into its obstructive position.

16. The child safety seat as of claim 1, wherein the support leg is pivotally connected with respect to a base of the child seat.

17. The child safety seat of claim 16, wherein the base is integral with a body of the seat.

18. The child safety seat of claim 16, wherein a body of the seat is separable from the base.

19. A base for a child safety seat comprising a support leg pivotally connected with respect to a forward facing portion of the base so as to swing inward toward the seat and outward away from the seat, and a releasable locking means which, during an accident where the leg swings inward, is activated by a forward acceleration of the seat to impose a limit to an extent of outward swing of the leg.

20. A locking mechanism configured for securement with respect to a child safety seat comprising a support leg pivotally connected with respect to a forward facing portion of the seat so as to swing inward toward the seat and outward away from the seat, wherein, during an accident where the leg swings inward, the locking mechanism is activated by a forward acceleration of the seat to impose a limit to an extent of outward swing of the leg.

* * * * *